United States Patent [19]
Madono

[11] 3,727,300
[45] Apr. 17, 1973

[54] METHOD OF JOINING CONSUMABLE ELECTRODE IN ELECTROSLAG MELTING

[75] Inventor: Osamu Madono, Yono, Japan

[73] Assignee: Riken Piston Ring Kogyo Kabushiki Kaisha, Tokyo, Japan

[22] Filed: Nov. 12, 1970

[21] Appl. No.: 88,881

[30] Foreign Application Priority Data

Nov. 20, 1969 Japan ................................. 44/92506

[52] U.S. Cl. ....................... 29/483, 219/145, 164/52
[51] Int. Cl. ........................... B23k 1/20, B23k 31/02
[58] Field of Search ...................... 219/145; 29/483, 29/592; 164/52

[56] References Cited

UNITED STATES PATENTS

| | | |
|---|---|---|
| 577,329 | 2/1897 | Slawianoff ........................ 219/145 X |
| 1,512,786 | 10/1924 | Morton ............................ 219/145 X |
| 2,039,167 | 4/1936 | Hopkins ........................... 219/145 X |
| 2,914,654 | 11/1959 | Lundohl et al. ................... 219/145 X |
| 3,131,290 | 4/1964 | Stepoth ............................ 219/145 X |
| 3,270,239 | 8/1966 | Lozier et al. ..................... 219/145 X |

FOREIGN PATENTS OR APPLICATIONS

| | | |
|---|---|---|
| 302,064 | 12/1928 | Great Britain ....................... 219/145 |
| 436,842 | 10/1935 | Great Britain ....................... 219/145 |

Primary Examiner—J. Spencer Overholser
Assistant Examiner—Ronald J. Shore
Attorney—Oldham & Oldham

[57] ABSTRACT

In the ingot moulding by the electroslag melting method of electrodes, preliminarily is formed convex or male screw at the lower end of the upper electrode and concave or female screw at the upper end of the lower electrode, and the electrodes are joined by being connected their ends.

1 Claim, 8 Drawing Figures

INVENTOR
OSAMU MADONO

BY Oldham & Oldham
ATTORNEY 3,727,300

METHOD OF JOINING CONSUMABLE ELECTRODE IN ELECTROSLAG MELTING

The present invention is related to the method of joining consumable electrode in electroslag melting for the purpose of continuous feeding the electrode.

BACKGROUNDS OF THE INVENTION

In drawings, FIG. 1, 2, 3 & 4 illustrate a conventional ingot moulding method by the electroslag melting the electrodes.

In the electroslag melting the electrode is melted in such a way that it is submerged under a slag which is electrically fused in a water-cooled metal mold by power current conducted through the slag from the electrode to ingot. The principle of the melting is schematically shown in FIG. 1, where 1 indicates a consumable electrode, 2 power connecting rolls, 3 rolls of feeding the electrode, 4 a water-cooled metal mold, 4a, 4b coolant inlet and outlet respectively 5 fused slag, 6 a molten pool of ingot, 7 solid ingot, 8 slag blanket, 9 a retractable stool.

The furnace shown in FIG. 1 is characterized by the fact that if feeding of the electrode 1 is continuously made, melting can also be continuously made to form an ingot 7. That is, if electrode could be continuously fed into the mold 4, it might be easy to produce an ingot of large tonnage or a long length. It should, however, be noted that in practice it is too hard continuously to feed electrode, so far as the conventional method of electroslag melting is concerned. It is due to this that in electroslag melting there has been a difficulty in producing ingots of large tonnage or long length. The reason that it has been hard continuously to feed electrode is owing to the fact that it is too difficult to prepare electrode usable for producing such large or long ingot.

As well known, in electroslag melting the ratio of the cross sectional area of electrode to that of ingot has to be smaller than at least half. Particularly in case of an ingot of small diameter or thickness it needs to reduce the ratio in order to prevent electric current from leakage toward the mold wall through slag or short circuit. In this case the fact that the cross-sectional ratio is reduced means that the length of the electrode has to be made longer. Therefore, to produce ingot of small diameter or a slab form of thin thickness an extremely long electrode will be needed if melting is continuously performed with the single electrode.

On the other hand, in case of producing large ingot electrode has to be increased in weight if the ingot is made by melting the electrode without supplying any additional electrode. However, it is not always preferable to increase the length or weight of electrode too much, because it makes it difficult to produce the electrode. Namely, the heavier or longer the electrode, the more difficult the preparation or handling of the electrode is. Hence, it is desirable that the electrode to be used for electroslag melting is made to a proper size convenient not only to preparing but also to handling.

When the electrode is thus prepared in a dimension of proper length or weight, it is too small to produce ingot of a given dimension. Therefore, for producing the ingot it is necessary to melt a number of electrodes by feeding them continuously one by one. For this purpose, in case of the conventional electroslag melting the method of replacing electrodes has been widely employed in such a way in which the furnace has a pair of electrode feeding devices permitting the replacement of the electrodes. Herein, when the first electrode is melted out, its feeder is made to retract from the mold and subsequently the second electrode is fed to continue the melting. This process, however, has the disadvantage that when electrode is replaced, there inevitably occurs an intervenience of melting. It results in the occurrence of discontinuity in the crystalline structure of ingot.

In electroslag melted ingots the discontinuity of crystalline structure is undesirable because of its harmful influence upon the quality of the material. Therefore, to eliminate such discontinuity melting has to be made without interruption throughout the whole ingot making.

Of course the idea of joining electrodes is not new but many attempts have been made to apply the method to electroslag melting. It should, however, be noted that all attempts have ended in failure, except the case of thin electrode. For example, the flash-welding process can be applied to the joining of thinner rods but not to the joining of larger electrodes. Therefore, in the conventional processes the method of arc welding has been used for joining larger diameter electrodes. For this two electrodes are butted together at their plane ends and the outside of the joint is arc welded as shown in FIG. 2. Here 1a and 1b indicate electrode, 10 the joint of electrodes, and 11 the deposit of weld. That is, in the case of larger diameter electrode it is hard to weld the whole cross-section of butted electrodes by arc from the surface to the center, the weld being limited to the outer layer of the joint.

The electrode thus partly welded has the disadvantage that there tends to take place the drop of unmelted piece of electrode when the joint part of the electrode is subjected to melt. The reason of the drop-down of unmelted piece is that the tio of melting electrode does not take a flat form but a convex form. FIG. 3 indicates the form of the tip of melting electrode, where 1 indicates the electrode, 5 molten slag, and 6 ingot molten pool. FIG. 4 shows the behaviour of electrode melting at the joint 10, where the outside layer is melted down faster than the center part, resulting in making a convex form. That is, when the weld 11 is melted down, the shadowed part 12 remains unmelted. Therefore, when the weld is melted out, the shadowed part 12 will be released out of the joint 10 to drop down into the molten pool 6. Farther, thus dropped piece is often entrapped by solidifying front to produce a discontinuity or defect in the ingot.

THE DISCLOSURE OF THE INVENTION

In the drawings, FIG. 5, 6 7 & 8 illustrate electroslag melting methods of the present invention:

Figure 1:
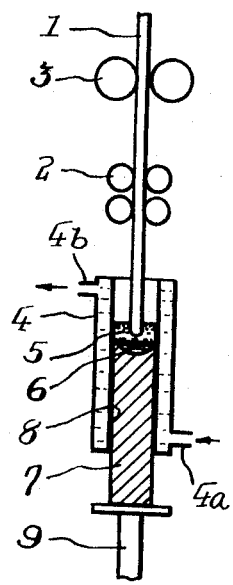
Figure 2:
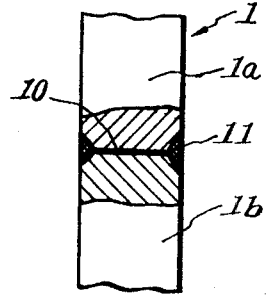
Figure 3:
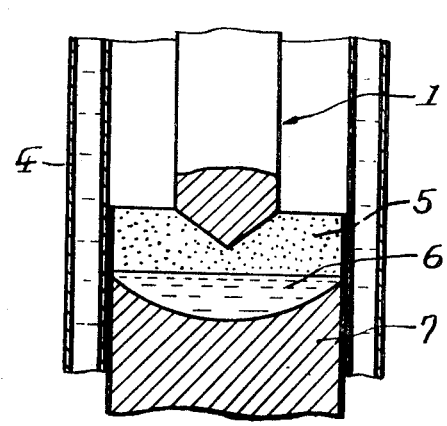
Figure 4:
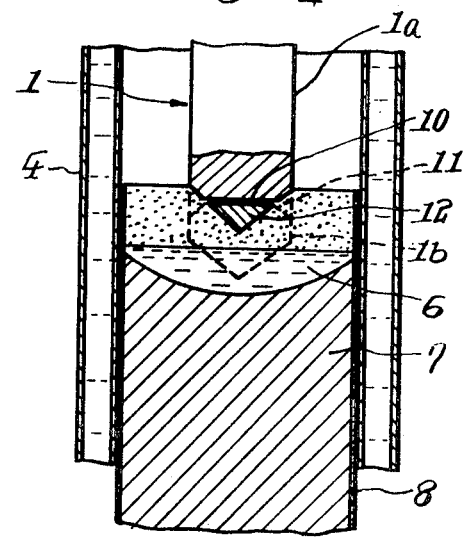
Figure 5:
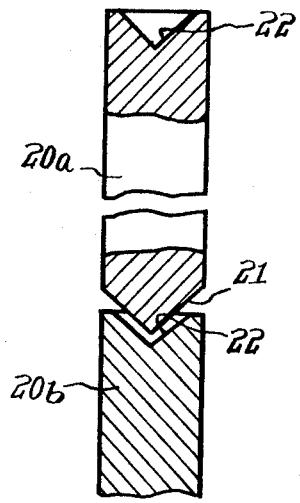
FIG. 5 is a sectional view of the forms of the upper and lower electrodes.
Figure 6:
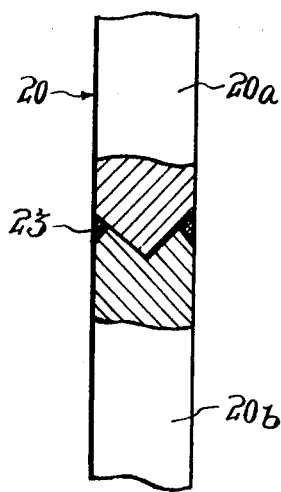
FIG. 6 is a sectional view of the upper and lower electrodes butted and welded at their ends.

The present invention is made for the purpose of improving the conventional method of joining electrodes in preventing the unmelted piece from releasing and dropping down into the molten pool. FIG. 5, FIG. 6, FIG. 7, FIG. 8. For this the most important feature consists in the form of the end of each electrode as shown in FIG. 5. That is, instead of the flat end form of the conventional electrodes the lower end 22 of upper electrode 20a is made to have a convex form and the upper end 22 of lower electrode 20b a concave form which is matched to the convex form. The two electrodes are joined by arc welding as shown in FIG. 6, where the weld is given by 23. In this case, although welding is applied only to the outside layer of the joint, the weld is made to have a depth enough for conducting electric power.

Figure 7:
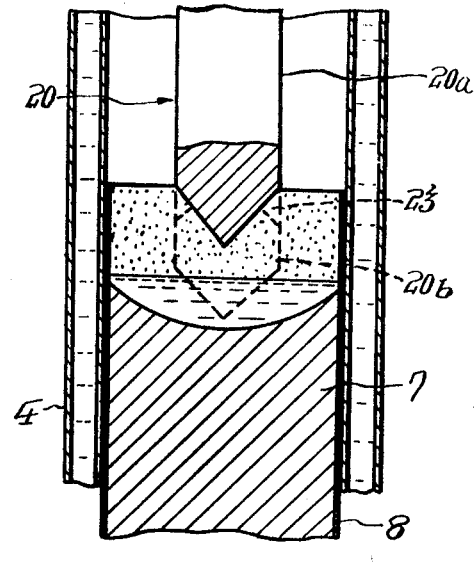
FIG. 7 shows the vertical section of the behaviour of the melting-down of the electrodes joined.

FIG. 7 indicates the behaviour of the melting-down of the electrode thus joined. As shown in FIG. 7, in this case the joint has the convexconcave form, there never occurs the release of unmelted piece from the tip of electrode even if welding is limited only to the outer layer of the joint. That is, before the weld 23 which hangs up the lower electorde 20b is melted out, the lower electrode 20b is completely melted down and the tip of electrode has been replaced by the upper electrode 20a.

Figure 8:
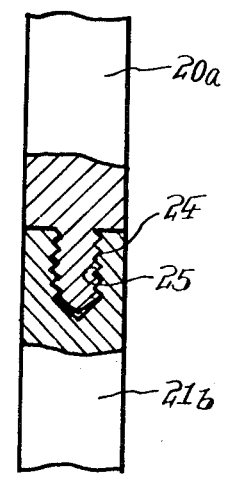
FIG. 8 is a sectional view of the upper and lower electrodes joined by the male and female screws.

Thus the joining of electrodes is preferably made by welding. However, mechanical method of joining as shown in FIG. 8 can be likewise used for joining an electrode of a cylindrical form in such a way that a male screw 24 is provided to the upper electrode 20a and a female screw 25 to the lower electrode 20b. FIG. 8 indicates the joint of electrode thus screwed up.

For example, a steel ingot of 400 mm in diameter was produced in an electroslag melting furnace by using an electrode of 200 mm in diameter. The slag consisted of 70 percent $CaF_2$ and 30 percent $Al_2O_3$ and the current was 15000 amperes at 50 volts. The length of each electrode was 1500 mm. The upper end of the electrode was made to have a concave form of cone and the lower end a convex form of cone. For joining a new electrode was placed onto the original electrode and arc welded without interrupting the melting. Herein the angle of the conical end was made to be 120° and the depth of the weld was about 20 mm.

Secondly, a steel ingot having a rectangular form of 800×200 mm was made by melting electrodes of 200×50×2000 mm in an electroslag furnace. The ends of each electrode had a form of triangle along the width direction. The weld was made along both width sides to a depth of about 15 mm. The angle of the triangle was 45°. The power supplied was 20,000 amperes at 50 volts and joining was similarly made during melting.

The quality of the steels thus produced was very good and no defect was found after they were rolled to finished products. This proved that there never occured any defect caused due to the drop of unmelted piece during electroslag melting, and that the results were enough successful.

In conclusions the present method of joining electrodes in the electroslag melting has the advantage that it makes it possible to feed electrode continuously without interrupting melting. Farther, there is no danger of drop-down of unmelted piece. Therefore, it permits the production of high quality ingots having any form in a way of continuous melting and casting.

What is claimed is:

1. A method of joining consumable electrodes for electroslag melting comprising forming the upper electrode with a conical male projection at its lower end and the lower electrode with a complementary female recess at its upper end, abutting the surfaces of the complementary projection and recess of the electrodes, and joining the upper and lower electrodes with the male projection fitted into the female recess to prevent the release downward of unmelted pieces from the tip of the upper electrode by welding said upper and lower electrodes together only at the continuous peripheral portion of the joint formed therebetween without welding their center portions together, which welded peripheral portion of the joint is above the lower end of the upper electrode.

* * * * *